(12) United States Patent
Guo et al.

(10) Patent No.: US 11,580,303 B2
(45) Date of Patent: Feb. 14, 2023

(54) METHOD AND DEVICE FOR KEYWORD EXTRACTION AND STORAGE MEDIUM

(71) Applicant: BEIJING XIAOMI MOBILE SOFTWARE CO., LTD., Beijing (CN)

(72) Inventors: Qun Guo, Beijing (CN); Xiao Lu, Beijing (CN); Erli Meng, Beijing (CN); Bin Wang, Beijing (CN); Liang Shi, Beijing (CN); Baoyuan Qi, Beijing (CN); Hongxu Ji, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 202 days.

(21) Appl. No.: 16/830,081

(22) Filed: Mar. 25, 2020

(65) Prior Publication Data
US 2021/0182490 A1    Jun. 17, 2021

(30) Foreign Application Priority Data
Dec. 13, 2019   (CN) .......................... 201911282700.3

(51) Int. Cl.
*G06F 40/289* (2020.01)
(52) U.S. Cl.
CPC ................. *G06F 40/289* (2020.01)
(58) Field of Classification Search
CPC .... G06F 40/289; G06F 16/355; G06F 40/258; G06F 40/44
See application file for complete search history.

(56) References Cited

U.S. PATENT DOCUMENTS

| | | | | |
|---|---|---|---|---|
| 8,166,045 B1 * | 4/2012 | Mazumdar | ............ | G06F 16/951 707/748 |
| 8,589,399 B1 * | 11/2013 | Lee | ........ | G06F 16/313 707/737 |
| 8,892,422 B1 * | 11/2014 | Kumar | .................. | G06F 40/289 704/9 |
| 11,030,394 B1 * | 6/2021 | Kozareva | .............. | G06F 40/151 |

(Continued)

FOREIGN PATENT DOCUMENTS

| | | |
|---|---|---|
| CN | 106021272 A | 10/2016 |
| CN | 108052593 A | 5/2018 |

(Continued)

OTHER PUBLICATIONS

European Search Report in the European Application No. 20165499.3, dated May 10, 2021, (9p).

(Continued)

*Primary Examiner* — Wilson W Tsui
(74) *Attorney, Agent, or Firm* — Arch & Lake LLP

(57) ABSTRACT

A method and device for keyword extraction and a storage medium. The method includes receiving, at a terminal, an original document, acquiring, at the terminal, a candidate set by extracting at least one candidate phrase from the original document, acquiring, at the terminal, an association degree between the at least one candidate phrase in the candidate set and the original document, acquiring, at the terminal, a divergence degree of the at least one candidate phrase in the candidate set, and updating, at the terminal, a key phrase set of the original document by selecting the at least one candidate phrase from the candidate set as at least one key phrase based on the association degree and the divergence degree.

14 Claims, 7 Drawing Sheets

(56) References Cited

U.S. PATENT DOCUMENTS

| | | | | |
|---|---|---|---|---|
| 2004/0098247 A1* | 5/2004 | Moore | ................. | G06F 40/45 |
| | | | | 704/4 |
| 2006/0242190 A1* | 10/2006 | Wnek | .................. | G06F 16/367 |
| 2006/0259481 A1* | 11/2006 | Handley | ............... | G06F 16/355 |
| 2015/0095770 A1* | 4/2015 | Mani | .................... | G06F 40/258 |
| | | | | 715/254 |
| 2016/0379229 A1* | 12/2016 | Akkiraju | ............ | G06Q 30/0282 |
| | | | | 705/7.31 |
| 2017/0139899 A1 | 5/2017 | Zhao | | |
| 2018/0113676 A1 | 4/2018 | De Sousa Webber | | |
| 2019/0057076 A1* | 2/2019 | Boguraev | ............ | G06F 40/211 |
| 2020/0150922 A1 | 5/2020 | De Sousa Webber | | |

FOREIGN PATENT DOCUMENTS

| | | |
|---|---|---|
| CN | 108319627 A | 7/2018 |
| CN | 110232112 A | 9/2019 |
| CN | 110232183 A | 9/2019 |
| WO | 2018073334 A1 | 4/2018 |

OTHER PUBLICATIONS

Pagliardini, M. et al., "Unsupervised Learning of Sentence Embeddings using Compositional n-Gram Features", NAACL-HLT, (13p).

* cited by examiner

METHOD AND DEVICE FOR KEYWORD EXTRACTION AND STORAGE MEDIUM

CROSS-REFERENCE TO RELATED APPLICATION

This application is filed based upon and claims the priority of Chinese patent application No. 201911282700.3, filed on Dec. 13, 2019, the entire contents of which are incorporated herein by reference.

TECHNICAL FIELD

The present disclosure generally relates to the technical field of data processing, and more particularly, to a method and device for keyword extraction and a storage medium.

BACKGROUND

Along with the explosive growth of Internet text data, it is usually necessary to extract a keyword capable of summarizing a key idea of a text in a related service to realize functions of accurate recommendation, key point labeling and the like. When such a service is executed, a standard is highly subjective, and it is difficult to acquire an available labeled corpus. Consequently, a conventional method is not so accurate, and consumption in calculation time is very high.

In the related art, there are two keyword extraction methods. The first method is keyword extraction (for a word appearing in a text), and the second method is keyword generation (for a word not appearing in the text).

Keyword extraction in the first method may be implemented in multiple manners, specifically including a statistical-based manner, a graph-based manner and a sequence-labeling-based manner. The statistical-based manner highly depends on a statistical characteristic designed by a specialist, and the graph-based manner is usually high in time complexity (usually greater than $O(n^2)$). The two manners have a common shortcoming, namely a screened keyword may not always be in a semantic association relationship with a text and a frequent term is preferred as a keyword. The sequence-labeling-based manner is a supervised method, depends on a labeled corpus and is only applied to tasks in the field of corpus training. Keyword generation in the second method may also be implemented in multiple manners, specifically including translation-alignment-based manner and a sequence-to-sequence (i.e., seq2seq) manner. Both of the two manners depend on a large number of labeled corpora and are high in calculation complexity and only applied to the field of corpus training.

SUMMARY

The present disclosure provides a method and device for keyword extraction and a storage medium.

According to a first aspect of the present disclosure, a method for keyword extraction is provided. In the method, a terminal receives an original document. The terminal acquires a candidate set by extracting at least one candidate phrase from the original document. The terminal acquires an association degree between the at least one candidate phrase in the candidate set and the original document. Where the association degree may be a degree of similarity between the at least one candidate phrase and the original document. The terminal acquires a divergence degree of the at least one candidate phrase in the candidate set. Where the divergence degree may be a degree of difference between the at least one candidate phrase and the candidate set. And the terminal updates a key phrase set of the original document by selecting the at least one candidate phrase from the candidate set as at least one key phrase based on the association degree and the divergence degree.

According to a second aspect of the disclosure, a device for keyword extraction is provided, the device may include: one or more processors, a non-transitory computer-readable storage medium configured to store a plurality of instructions executable by the one or more processors, where the one or more processors may be configured to receive an original document. The one or more processors may be configured to acquire a candidate set by extracting at least one candidate phrase from the original document. The one or more processors may be configured to acquire an association degree between the at least one candidate phrase in the candidate set and the original document. Where the association degree may be a degree of similarity between the at least one candidate phrase and the original document. The one or more processors may be configured to acquire a divergence degree of the at least one candidate phrase in the candidate set. Where the divergence degree may be a degree of difference between the at least one candidate phrase and the candidate set. And the one or more processors may be configured to update a key phrase set of the original document by selecting the at least one candidate phrase from the candidate set as at least one key phrase based on the association degree and the divergence degree.

According to a third aspect of the present disclosure, a non-transitory computer-readable storage medium having a plurality of instructions stored thereon is provided, the instructions when being executed by a computing device having one or more processors to perform acts that may include receiving an original document. The one or more processors perform acts that may include acquiring a candidate set by extracting at least one candidate phrase from the original document. The one or more processors perform acts that may include acquiring an association degree between at least one candidate phrase in the candidate set and the original document, where the association degree may be a degree of similarity between the at least one candidate phrase and the original document. The one or more processors perform acts that may include acquiring a divergence degree of the at least one candidate phrase in the candidate set, where the divergence degree may be a degree of difference between the at least one candidate phrase and the candidate set. And the one or more processors perform acts that may include updating a key phrase set of the original document by selecting the at least one candidate phrase from the candidate set as at least one key phrase based on the association degree and the divergence degree.

It is to be understood that the above general descriptions and detailed descriptions below are only examples and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to embodiments, examples of which are illustrated in the accompanying drawings. The following description refers to the accompanying drawings in which the same numbers in different drawings represent the same or similar elements unless otherwise represented. The implementations set forth in the following description of embodiments do not represent all implementations consistent with the present disclosure. Instead, they are merely examples of apparatuses and methods consistent with aspects related to the present disclosure as recited in the appended claims.

The terminology used in the present disclosure is for the purpose of describing particular embodiments only and is not intended to limit the present disclosure. As used in the present disclosure and the appended claims, the singular forms "a," "an," and "the" are intended to include the plural forms as well, unless the context clearly indicates otherwise. It shall also be understood that the term "and/or" used herein is intended to signify and include any or all possible combinations of one or more of the associated listed items.

It shall be understood that, although the terms "first," "second," "third," etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to a judgment" depending on the context.

Figure 1:
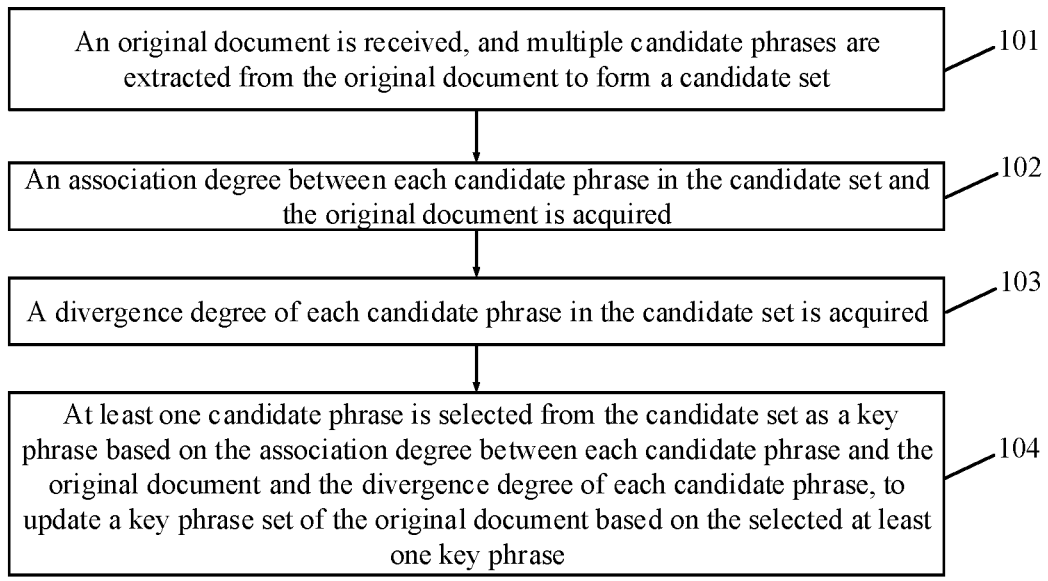
FIG. 1 is a first flow chart showing a keyword extraction method, according to an example of the present disclosure.

One or more embodiments of the present disclosure provides a keyword extraction method. Referring to FIG. 1, FIG. 1 is a flow chart showing a keyword extraction method, according to some embodiments of the disclosure. As shown in FIG. 1, the method includes the following operations.

In Operation 101, an original document is received, and multiple candidate phrases are extracted from the original document to form a candidate set. For example, the electronic device may acquire a candidate set by extracting at least one candidate phrase from the original document.

In Operation 102, an association degree between each candidate phrase in the candidate set and the original document is acquired. For example, the electronic device may acquire an association degree between the at least one candidate phrase in the candidate set and the original document, where the association degree is a degree of similarity between the at least one candidate phrase and the original document.

In Operation 103, a divergence degree of each candidate phrase in the candidate set is acquired. For example, the electronic device may acquire a divergence degree of the at least one candidate phrase in the candidate set, where the divergence degree is a degree of difference between the at least one candidate phrase and the candidate set.

In Operation 104, at least one candidate phrase is selected from the candidate set as a key phrase based on the association degree between each candidate phrase and the original document and the divergence degree of each candidate phrase, to update a key phrase set of the original document based on the selected at least one key phrase. For example, the electronic device may update the key phrase set of the original document by selecting the at least one candidate phrase from the candidate set as at least one key phrase based on the association degree and the divergence degree.

Here, the keyword extraction method may be applied to a mobile terminal and a stationary terminal. The mobile terminal includes a mobile phone, a tablet computer, a notebook computer and the like. The stationary terminal includes a personal computer. In another alternative embodiment, the keyword extraction method may also run in a network-side device. The network-side device includes a server, a processing center and the like.

In another alternative embodiment, the method shown in FIG. 1 further includes an operation that the key phrase set of the original document is output. The operation that the key phrase set of the original document is output includes at least one of the following operations: the key phrase set of the original document is sent from one mobile terminal to another mobile terminal; the key phrase set of the original document is sent from a network-side device to a mobile terminal; the key phrase set of the original document is sent from a mobile terminal to a network-side device; the key phrase set of the original document is displayed on a display device; and the key phrase set of the original document is played on a play device.

Here, the candidate phrase is a word or word group, etc. in the original document. In embodiments of the present disclosure, the multiple candidate phrases may be extracted from the original document based on a candidate phrase extraction rule, to form a candidate set based on the extracted multiple candidate phrases. After the candidate set is formed, the association degree between each candidate phrase in the candidate set and the original document and the divergence degree of each candidate phrase in the candidate set may be acquired, and the key phrase in the candidate set may be determined based on the association degree and the divergence degree to update the key phrase set of the original document based on the determined key phrase.

For example, the candidate phrase extracted from the original document based on the candidate phrase extraction rule may be a nominal phrase combined by a modifying word and a nominal word and the like, and the part of speech of the modifying word may be an adjective, a noun or a word of another part of speech capable of modifying a noun. For example, "phone" is a nominal word, "foldable phone" is a nominal phrase, "foldable" is an adjective modifying word, and the nominal phrase is a phrase combined by the adjective modifying word and the nominal word. For another example, "phone" is a nominal word, "phone with a curved screen" is a nominal phrase, "curved screen" is a nominal modifying word, and the nominal phrase is a phrase combined by the nominal modifying word and the nominal word.

If the original document is a document introducing functions of a mobile phone and a content of the document includes "a phone with a curved screen capable of taking photo and the phone has a camera", "phone with a curved screen" in the original document may be determined as a candidate phrase.

In embodiments of the present disclosure, the association degree between the candidate phrase and the original document is configured to represent a similarity between the candidate phrase and the original document, and if the association degree is higher, the similarity between the candidate phrase and the original document is higher. The divergence degree may represent a difference between the candidate phrase and a key phrase that has been selected into the key phrase set, and if the divergence degree is higher, the difference between the candidate phrase and the key phrase that has been selected into the key phrase set is greater.

Compared with selection of the key phrase only based on counts of the candidate phrases, the present disclosure has the advantages that an association relationship between the candidate phrase, the original document and the key phrase that has been selected into the key phrase set is considered, so that a high similarity between the extracted key phrase and the original document may be ensured to further improve accuracy and commonality of the extracted key phrase, and a great difference between the extracted key phrase and the key phrase that has been selected into the key phrase set may be ensured to further improve diversity of the extracted key phrase.

Figure 2:
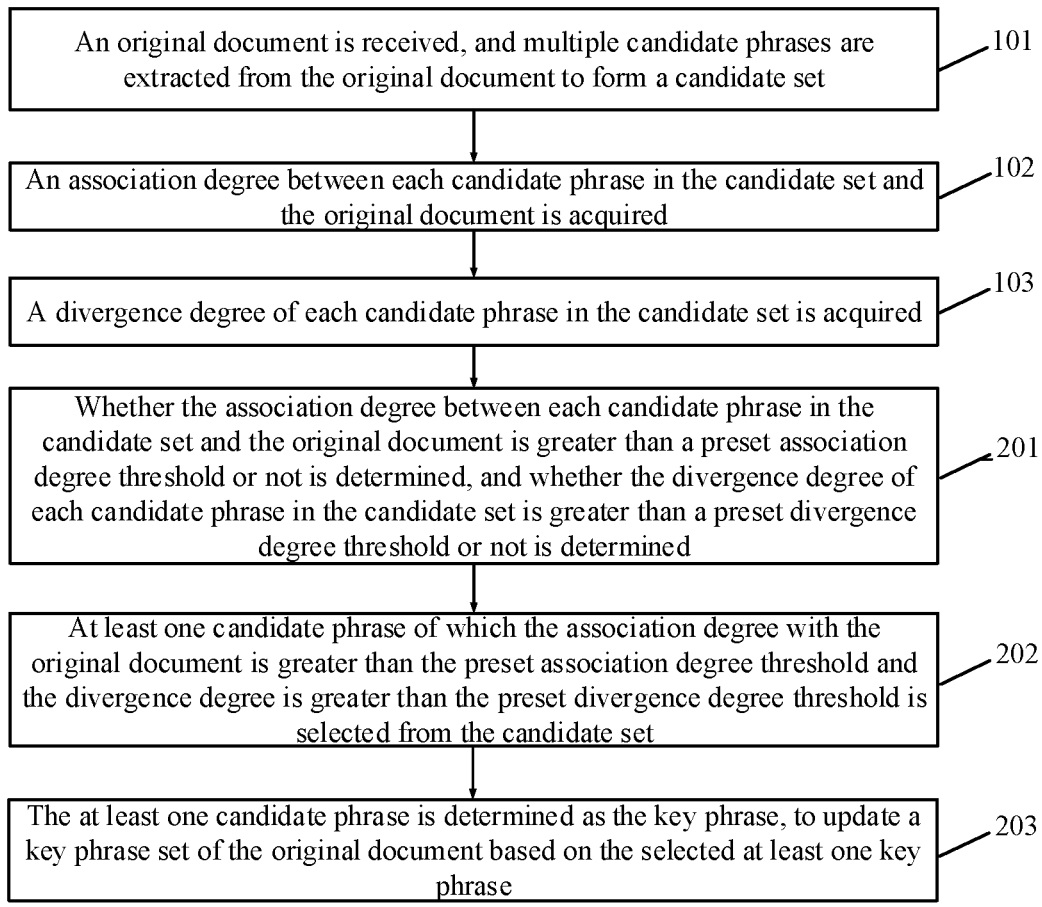
FIG. 2 is a second flow chart showing a keyword extraction method, according to an example of the present disclosure.

In another alternative embodiment, a keyword extraction method is also provided. Referring to FIG. 2, FIG. 2 is a second flow chart showing a keyword extraction method, according to some embodiments of the disclosure. The method is based on the method shown in FIG. 1, and Operation 104 includes the following operations.

In Operation 201, whether the association degree between each candidate phrase in the candidate set and the original document is greater than a preset association degree threshold is determined, and whether the divergence degree of each candidate phrase in the candidate set is greater than a preset divergence degree threshold is determined.

In Operation 202, at least one candidate phrase of which the association degree with the original document is greater than the preset association degree threshold and the divergence degree is greater than the preset divergence degree threshold is selected from the candidate set.

In Operation 203, the at least one candidate phrase is determined as the key phrase, to update the key phrase set of the original document based on the selected at least one key phrase.

Here, the preset association degree threshold and the preset divergence degree threshold may be set as required. For example, it may be set that the preset association degree threshold is 50% and the preset divergence degree threshold is 80%. In such case, the candidate phrase of which the association degree with the original document is greater than 50% and the divergence degree is greater than 80% may be selected from the candidate set as the key phrase forming the key phrase set.

In another alternative embodiment, when it is determined that the number of the key phrases in the key phrase set is more than or equal to a preset number threshold or the candidate set includes no candidate phrase of which the association degree with the original document is greater than the preset association degree threshold and the divergence degree is greater than the preset divergence degree threshold, key phrase extraction is ended.

Here, since the association degree is used to represent the similarity between the candidate phrase and the original document, when the association degree is relatively low, it is represented that the similarity between the candidate phrase and the original document is relatively low, and in such case, if the candidate phrase of which the association degree with the original document is relatively low is determined as a key phrase, the accuracy of the key phrase in the finally determined key phrase set may be reduced. In embodiments of the present disclosure, the preset association degree threshold is preset, so that the candidate phrase of which the similarity with the original document is relatively high may be extracted in a key phrase extraction process, and the accuracy of extracting the key phrase may further be improved.

Since the divergence degree is used to represent the difference between the candidate phrase and the key phrase that has been selected into the key phrase set, if the divergence degree is higher, the difference between the candidate phrase and the key phrase that has been selected into the key phrase set is greater, namely the similarity between the candidate phrase and the key phrase that has been selected into the key phrase set is lower. In embodiments of the present disclosure, the preset divergence degree threshold is preset, so that the candidate phrase of which the similarity with the original document is high and the similarity with the key phrase that has been selected into the key phrase set is low may be extracted in the key phrase extraction process. Therefore, the diversity of the finally determined key phrase in the key phrase set may be improved on the basis of ensuring the accuracy of the extracted key phrase.

Figure 3:
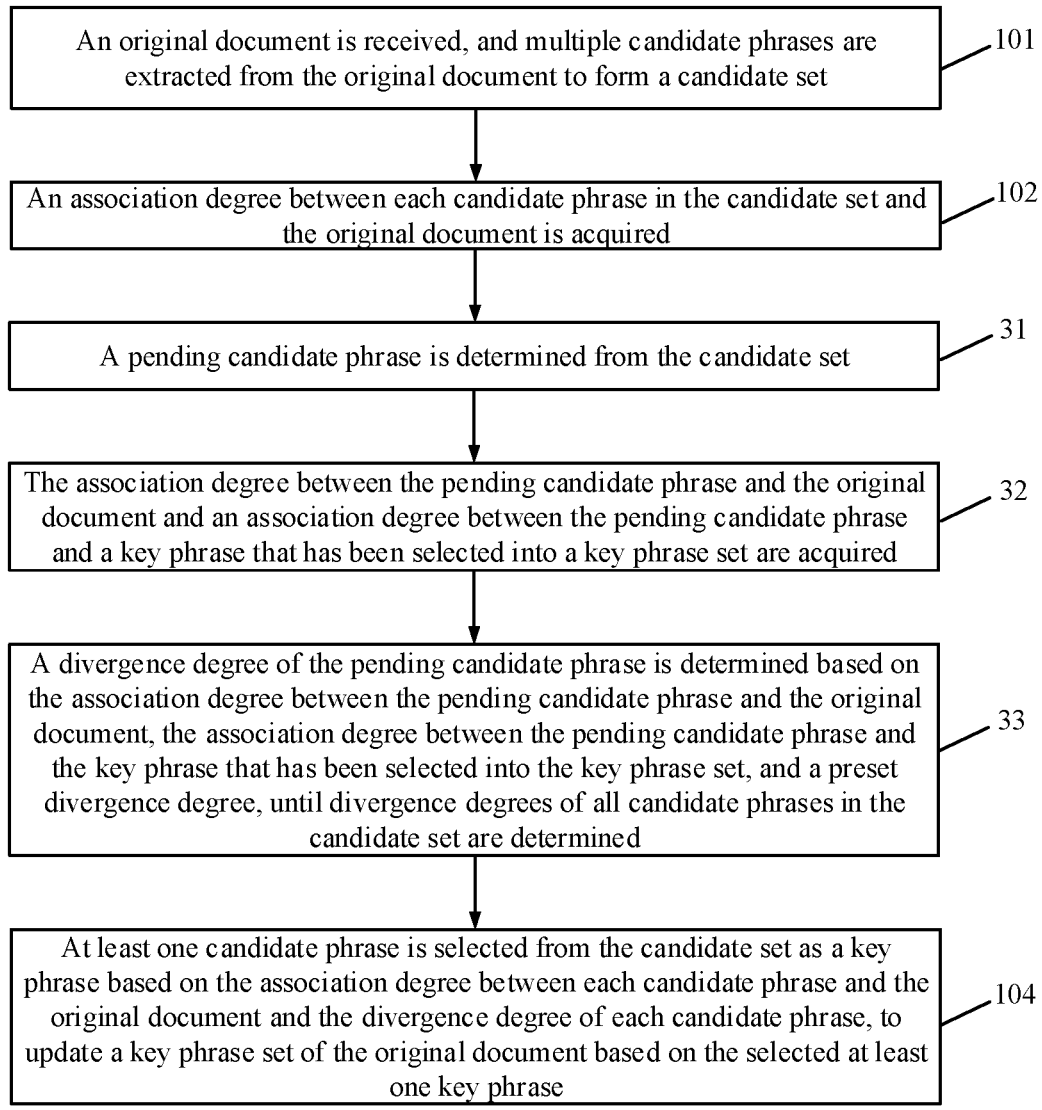
FIG. 3 is a third flow chart showing a keyword extraction method, according to an example of the present disclosure.

In another alternative embodiment, a keyword extraction method is also provided. Referring to FIG. 3, FIG. 3 is a third flow chart showing a keyword extraction method, according to some embodiments of the disclosure. The method is based on the method shown in FIG. 1, and Operation 103 includes the following operations.

In Operation 31, a candidate phrase is selected from the candidate set.

In Operation 32, an association degree between the pending candidate phrase and the original document and an association degree between the pending candidate phrase and a key phrase that has been selected into the key phrase set are acquired.

In Operation 33, a divergence degree of the pending candidate phrase is determined based on the association degree between the pending candidate phrase and the original document, the association degree between the pending candidate phrase and the key phrase that has been selected into the key phrase set and a preset divergence degree, until divergence degrees of all candidate phrases in the candidate set are determined.

Here, before the pending candidate phrase in the candidate set is determined, part of candidate phrases in the candidate set have been selected into the key phrase set. Since the key phrase set is null in an initial stage of the key phrase extraction, an initial key phrase to be selected into the key phrase set may be determined based on the association degree between each candidate phrase in the candidate set and the original document. For example, a candidate phrase of which the association degree with the original document is maximum in the candidate set may be determined as the initial key phrase. In such case, an initial key phrase is the first key phrase selected into the key phrase set.

When the key phrases selected into the key phrase set have existed in the key phrase set, the pending candidate phrase in the candidate set may be determined based on a set rule. For example, the pending candidate phrase in the candidate set can be determined in a traversing manner.

After the pending candidate phrase is determined, the association degree between the pending candidate phrase and the original document and the association degree between the pending candidate phrase and the key phrase that has been selected into the key phrase set may be acquired. Then, the divergence degree of the pending candidate phrase is determined based on the association degree between the pending candidate phrase and the original document, the association degree between the pending candidate phrase and the key phrase that has been selected into the key phrase set and the preset divergence degree. The preset divergence degree may be set as required. Therefore, the divergence degree of the candidate phrase can be regulated freely by regulating the preset divergence degree, to reduce a probability of repetition between the key phrases selected into the key phrase set and further reduce key phrase extraction redundancy.

In another alternative embodiment, a calculation formula for the divergence degree of the pending candidate phrase is:

$$S_1(x, D) = \underset{x \in \Omega \backslash \theta}{\arg\max}\left[(1-\lambda)S(x, D) - \lambda \underset{y \in \theta}{\max} y_{sim}(x, y)\right]. \quad (1)$$

In Formula (1), x represents a phrase characteristic vector of the pending candidate phrase, y represents a phrase characteristic vector of the key phrase that has been selected into the key phrase set, $S_1(x, D)$ represents the divergence degree of the pending candidate phrase, $S(x, D)$ represents the association degree between the pending candidate phrase and the original document, $Y_{sim}(x, y)$ represents the association degree between the pending candidate phrase and the key phrase that has been selected into the key phrase set, represents the preset divergence degree, is more than or equal to 0 and less than or equal to 1, represents all candidate phrases in the candidate set, θ represents all key phrases that have been selected into the key phrase set, x∈Ω\θ represents candidate phrases, except those having been selected into the key phrase set, in the candidate set, and y∈θ represents a key phrase that has been selected into the key phrase set.

It may be seen from Formula (1) that, when the association degree between the pending candidate phrase and the original document is determined, if the association degree between the pending candidate phrase and the key phrase that has been selected into the key phrase set is higher, the divergence degree of the pending candidate phrase is lower, and when the association degree between the pending candidate phrase and the key phrase that has been selected into the key phrase set is determined, if the association degree between the pending candidate phrase and the original document is higher, the divergence of the pending candidate phrase is higher.

In an implementation process, the divergence degree of each candidate phrase in the candidate set may be determined based on Formula (1), and in conjunction with the association degree between each candidate phrase in the candidate set and the original document, the candidate phrase of which the association degree is greater than the preset association degree threshold and the divergence degree is greater than the preset divergence degree threshold is determined as the key phrase. For example, the candidate phrase of which the association degree with the original document is greater than 50% and the divergence degree is maximum is determined as a key phrase. Therefore, the divergence degree of the candidate phrase can be regulated freely by regulating the preset divergence degree, to reduce the probability of repetition between the key phrases selected into the key phrase set and further reduce key phrase extraction redundancy.

In another alternative embodiment, the operation that the multiple candidate phrases are extracted from the original document includes the following operations.

Multiple candidate phrases matched with a preset phrase granularity are extracted from the original document according to a candidate phrase extraction rule determined based on the preset phrase granularity. Each of the candidate phrases matched with the preset phrase granularity includes a nominal phrase combined by a modifying word and a nominal word.

Here, the candidate phrase extraction rule may be a rule determined according to the preset phrase granularity, and the preset phrase granularity may be determined according to a preset word number or type. Before a nominal phrase is extracted from the original document based on the candidate phrase extraction rule, the preset phrase granularity may be preset. For example, the preset phrase granularity means extracting a candidate phrase combined by a noun and a noun from the original document or extracting a candidate phrase combined by an adjective, an auxiliary word and a noun from the original document. In embodiments of the present disclosure, the candidate phrase extraction granularity may be freely regulated as required, so that key phrase extraction flexibility and diversity may be improved.

In another alternative embodiment, the method further includes the following operations:

a denoised document is formed by extracting at least one of verbal, nominal or adjective words from the original document;

a document characteristic vector of the denoised document is calculated by use of a vector generation model trained based on an unlabeled corpus;

at least one of nominal words or nominal phrases is selected from the denoised document to obtain a to-be-clustered word set, each of the nominal phrases is combined by a modifying word and a nominal word; and a word characteristic vector of each to-be-clustered word in the to-be-clustered word set is acquired by use of the vector generation model, and the to-be-clustered words are clustered according to their respective word characteristic vectors to determine multiple cluster sets of the original document.

Here, multiple clustering methods are adopted, for example, a K-means clustering method, a mean shift clustering method, a density-based clustering method, Expectation Maximization (EM) clustering using Gaussian Mixture Model (GMM), agglomerative hierarchical clustering and a graph group detection clustering method. Before clustering, the number of target cluster centers may be preset (for example, set to be 3). When the number of the target cluster centers can be set according to the word number of a document to be clustered, and if the word number is larger, the number of the target cluster centers is set to be larger. By each of the abovementioned clustering methods through which the cluster centers may be provided, similar effects may be achieved. The K-means clustering method has the advantages of stable effect, relatively low implementation time complexity and capability of specifying the number of clusters. Here, the noun may be a nominal word or a nominal phrase, and the modifying word includes an adjective or a noun, etc.

The document characteristic vector of the denoised document may be calculated by use of the vector generation model in one of the following manners.

A first manner: the document characteristic vector of the denoised document is calculated by use of a sentence-to-vector model. For example, the sentence-to-vector model is a sent2vec model.

A second manner: a word characteristic vector of each word in the denoised document is calculated by use of a word-to-vector model, and a mean value of the word characteristic vectors of all the words in the denoised document is calculated as the document characteristic vector of the denoised document. For example, the word-to-vector model is a word2vec model. The vector generation model may be trained based on the unlabeled corpus.

In an implementation mode, the operation that the document characteristic vector of the denoised document is calculated by use of the sentence-to-vector model in the first manner includes a preparation stage and a training stage.

In the preparation stage, a corpus including a preset number of words and related to the field of the original document (for example, an unlabeled corpus including more than 2 million sentences) is prepared, the language of the corpus is the same as that of the original document. For example, when the original document is Chinese, the prepared corpus is Chinese. That is, when the original document is English, the prepared corpus is English. The corpus is usually an unlabeled corpus. Here, a system and model software related to the sentence-to-vector model may be installed. For example, python3.5 and sent2vec tool software are installed.

In the training stage, the corpus is trained by use of model software. A process of training the corpus by use of the sent2vec tool software will be described below as an example.

In Operation 1, the prepared corpus is cleaned to ensure that each sentence in the cleaned corpus is a grammatically right and unambiguous natural language sentence. A specific cleaning method is to remove parts incapable of effectively expressing a main idea of the corpus such as special characters, programming languages (for example, Hypertext Markup Language (HTML) sentences), etc.

In Operation 2, the cleaned corpus is broken into sentences, the sentences are separated by first preset symbols (for example, line breaks).

In Operation 3, each sentence in the corpus broken into the sentences is segmented into words, the words are separated by second preset symbols (for example, space symbols). The sentences may be segmented by use of open-source software.

In Operation 4, corpus contents obtained after the sentences are segmented into the words are coded in a utf-8 coding format and stored in a .txt file.

In Operation 5, it is ensured that a computer memory exceeds 16G, and the sent2vec tool software is run. A related parameter required by running of the software is set. For example, the following settings are made: it is required that a minimum count (minCount) of the word in the corpus is 10, a word or document vector dimension (dim) is 500, a maximum conjunction number (wordNgrams) is 2, conjunction referring to connecting two words together as a word, a negative sampling number (neg) in the training process is 10, a dropout number (dropoutK) in the training process is 4, a cached word number (bucket) in the training process is 1,000,000, and a maximum reserved word number (maxVocabSize) of the sent2vec model is 500,000.

In Operation 6, the .txt tile is loaded, the sent2vec model is trained by use of the corpus of which the sentences are segmented into the words, and after successful training, the successfully trained sent2vec model is stored in a .bin format.

In another alternative embodiment, the operation that the association degree between each candidate phrase in the candidate set and the original document is acquired includes an operation that the association degree between each candidate phrase and the original document is calculated according to the document characteristic vector of the denoised document, the multiple cluster sets and a phrase characteristic vector of each candidate phrase in the candidate set.

The association degree between the phrase and the document may be calculated by multiple methods, for example, a Term Frequency-Inverse Document Frequency (TF-IDF) algorithm, a Latent Semantic Indexing (LSI) algorithm, a Word Mover's Distance (WMD) method, etc.

In embodiments of the present disclosure, a calculation formula for the association degree between each candidate phrase in the candidate set and the original document is:

$$S(z, D) = \alpha \cdot Y_{sim}(z, V_0) + \beta \cdot \frac{\sum_{i=1}^{M} Y_{sim}(z, C_i)}{M}. \quad (2)$$

In Formula (2), z represents a phrase characteristic vector of any candidate phrase in the candidate set, S(z, D) represents an association degree between any candidate phrase in the candidate set and the original document, $\alpha$ represents a first weight coefficient, $\beta$ represents a second weight coefficient, $Y_{sim}(\ )$ is a similarity function, $V_0$ represents the document characteristic vector, $C_i$ is a cluster characteristic vector of the $i^{th}$ cluster set, M is the number of cluster sets, i and M are positive integers, $Y_{sim}(z, C_i)$ represents an association degree between each candidate phrase in the candidate set and the cluster characteristic vector of the ith cluster set, and $Y_{sim}(z, V_0)$ represents the association degree between each candidate phrase in the candidate set and the document characteristic vector.

The similarity function may be any function capable of representing a similarity between two vectors. For example, the similarity function is a cosine similarity function, a Euclidean distance, a Manhattan distance, a Chebyshev distance, a Minkowski distance, a Hamming distance and a Jaccard distance.

In another alternative embodiment, Formula (2) may be used to calculate the association degree between any phrase in the phrase set and the document. A method for calculating the association degree between a phrase and the document by use of Formula (2) is implemented based on the sent2vec model and clustering processing. Effective classification is implemented by clustering processing based on optimization processing of a document or sentence-level vector representation with the sent2vec model, so that the phrase may be mapped to the same semantic space better. The association degree between the phrase and the document may be expressed more accurately and effectively by combining an association degree between the phrase and the document characteristic vector and an association degree between the phrase and a cluster characteristic vector in Formula (2).

Figure 4:
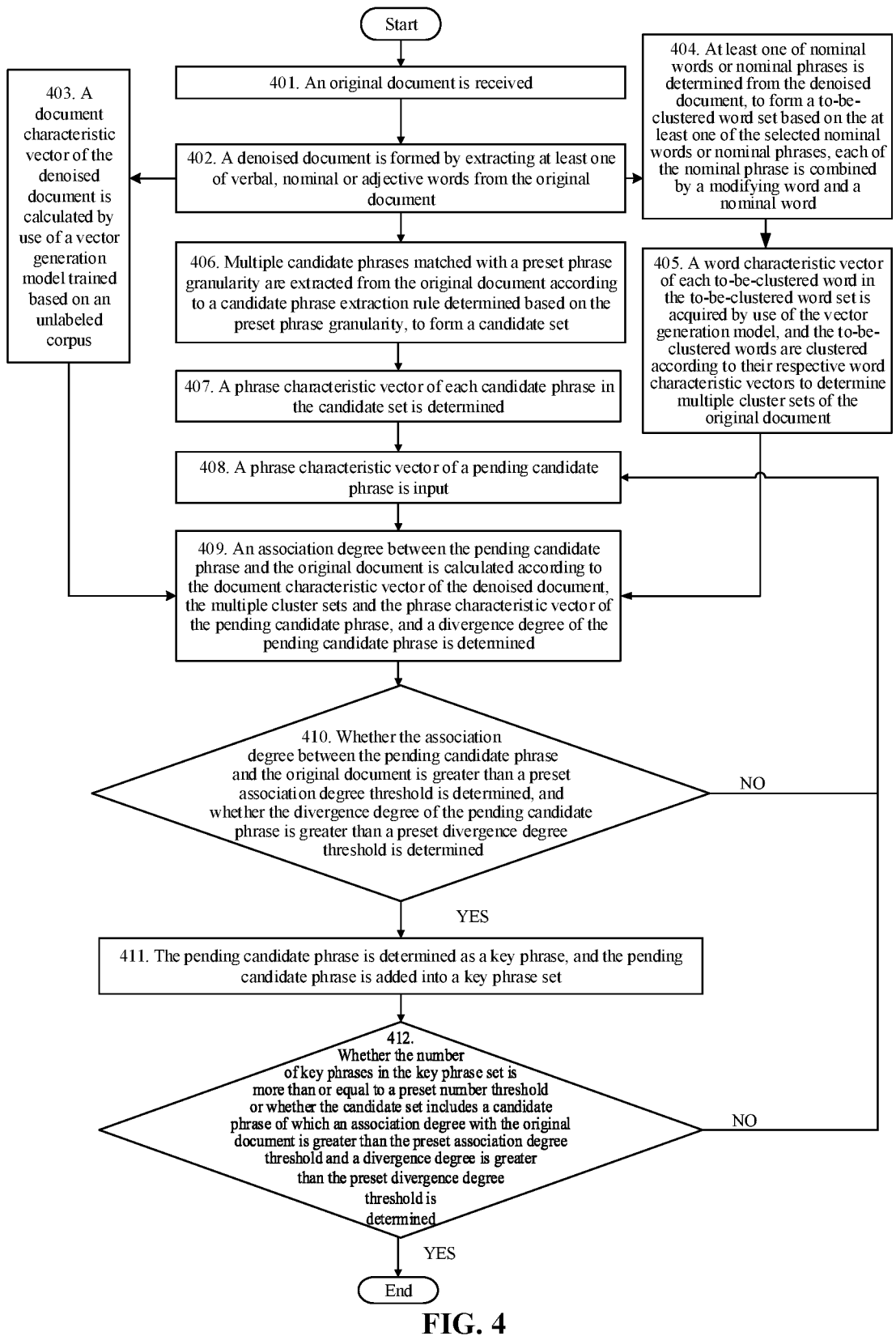
FIG. 4 is a fourth flow chart showing a keyword extraction method, according to an example of the present disclosure.

One or more embodiments of the present disclosure provide a keyword extraction method. Referring to FIG. 4, FIG. 4 is a fourth flow chart showing a keyword extraction method, according to some embodiments of the disclosure. As shown in FIG. 4, the method includes the following operations.

In Operation 401, an original document is received.

In Operation 402, a denoised document is formed by extracting at least one of verbal, nominal or adjective words from the original document.

In Operation 403, a document characteristic vector of the denoised document is calculated by use of a vector generation model trained based on an unlabeled corpus.

In Operation 404, at least one of nominal words or nominal phrases is selected from the denoised document, to form a to-be-clustered word set based on the selected at least one of nominal words or nominal phrases, each of the nominal phrases is combined by a modifying word and a nominal word.

In Operation 405, a word characteristic vector of each to-be-clustered word in the to-be-clustered word set is acquired by use of the vector generation model, and the to-be-clustered words are clustered according to their respective word characteristic vectors to determine multiple cluster sets of the original document.

In Operation 406, multiple candidate phrases matched with a preset phrase granularity are extracted from the original document according to a candidate phrase extraction rule determined based on the preset phrase granularity to form a candidate set. The operation 406 may be performed simultaneously or parallelly with operations 404 and 405 to improve efficiency or reduce time required to form the candidate set.

In Operation 407, a phrase characteristic vector of each candidate phrase in the candidate set is determined. The operation 407 may be performed simultaneously or parallelly with operations 404 and 405 to improve efficiency or reduce time required to form or update the key phrase set.

In Operation 408, a phrase characteristic vector of a pending candidate phrase is input.

In Operation 409, an association degree between the pending candidate phrase and the original document is calculated according to the document characteristic vector of the denoised document, the multiple cluster sets and the phrase characteristic vector of the pending candidate phrase, and a divergence degree of the pending candidate phrase is determined.

In Operation 410, whether the association degree between the pending candidate phrase and the original document is greater than a preset association degree threshold is determined, and whether the divergence degree of the pending candidate phrase is greater than a preset divergence degree threshold is determined.

In Operation 411, when the association degree between the pending candidate phrase and the original document is greater than the preset association degree threshold and the divergence degree of the pending candidate phrase is greater than the preset divergence degree threshold, the pending candidate phrase is determined as a key phrase, and the pending candidate phrase is added into a key phrase set.

In Operation 412, whether the number of key phrases in the key phrase set is more than or equal to a preset number threshold or whether the candidate set includes a candidate phrase of which an association degree with the original document is greater than the preset association degree threshold and a divergence degree is greater than the preset divergence degree threshold is determined.

Here, when it is determined that the number of the key phrases in the key phrase set is more than or equal to the preset number threshold or the candidate set includes no candidate phrase of which an association degree with the original document is greater than the preset association degree threshold and a divergence degree is greater than the preset divergence degree threshold, key phrase extraction is ended. When the number of the key phrases in the key phrase set is less than the preset number threshold and the candidate set includes a candidate phrase of which the association degree with the original document is greater than the preset association degree threshold and the divergence degree is greater than the preset divergence degree threshold, Operation 408 to Operation 412 are continued to be executed.

In embodiments of the present disclosure, compared with the related art that the key phrase is selected only based on the counts of the candidate phrases, the present disclosure has the advantages that: on a first aspect, the divergence degree of the candidate phrase may be freely regulated to reduce the probability of repetition between the key phrases selected into the key phrase set and further reduce key phrase extraction redundancy; on a second aspect, influence of a term frequency of a candidate word is avoided, so that unlike the related art where a high-frequency word is preferred to be selected, here it is not so; and on a third aspect, the candidate phrase extraction granularity may be freely regulated as required, so that the key phrase extraction flexibility and diversity may be improved. Therefore, the characteristics of high accuracy, high semantic relevancy, complete covered themes, high calculation speed and high extensibility are achieved.

Figure 5:
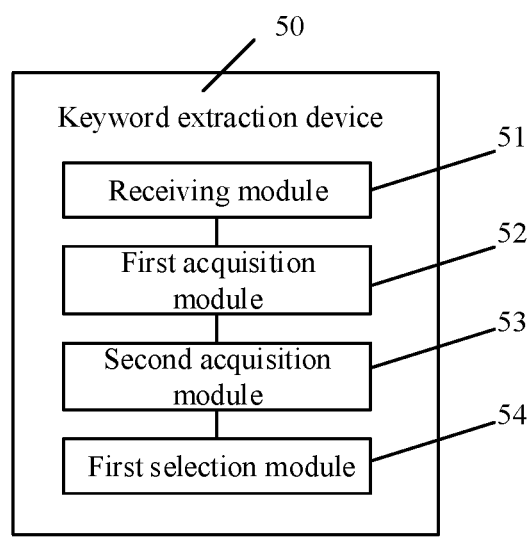
FIG. 5 is a block diagram of a keyword extraction device, according to an example of the present disclosure.

FIG. 5 is a block diagram of a keyword extraction device, according to some embodiments of the disclosure. As shown in FIG. 5, the keyword extraction device 50 mainly includes a receiving module 51, a first acquisition module 52, a second acquisition module 53 and a first selection module 54.

The receiving module 51 is configured to receive an original document and extract multiple candidate phrases from the original document to form a candidate set.

The first acquisition module 52 is configured to acquire an association degree between each candidate phrase in the candidate set and the original document.

The second acquisition module 53 is configured to acquire a divergence degree of each candidate phrase in the candidate set.

The first selection module 54 is configured to select at least one candidate phrase from the candidate set as a key phrase based on the association degree and the divergence degree, to form a key phrase set of the original document based on the selected at least one key phrase.

In another alternative embodiment, the first selection module 54 includes a determination submodule, a selection submodule and a first determination submodule.

The determination submodule is configured to determine whether the association degree between each candidate phrase in the candidate set and the original document is greater than a preset association degree threshold and determine whether the divergence degree of each candidate phrase in the candidate set is greater than a preset divergence degree threshold.

The selection submodule is configured to select at least one candidate phrase of which the association degree with the original document is greater than the preset association degree threshold and the divergence degree is greater than the preset divergence degree threshold is selected from the candidate set.

The first determination submodule is configured to determine the at least one candidate phrase as the key phrase.

In another alternative embodiment, the second acquisition module 53 includes a second determination submodule, an acquisition submodule and a third determination submodule.

The second determination submodule is configured to determine a pending candidate phrase from the candidate set.

The acquisition submodule is configured to acquire an association degree between the pending candidate phrase and the original document and an association degree between the pending candidate phrase and a key phrase that has been selected into the key phrase set.

The third determination submodule is configured to determine a divergence degree of the pending candidate phrase based on the association degree between the pending candidate phrase and the original document, the association degree between the pending candidate phrase and the key phrase that has been selected into the key phrase set and a preset divergence degree until divergence degrees of all candidate phrases in the candidate set are determined.

In another alternative embodiment, a calculation formula for the divergence degree of the pending candidate phrase is:

$$S_1(x, D) = \arg\max_{x \in \Omega \setminus \theta}\left[(1 - \lambda)S(x, D) - \lambda\max_{y \in \theta} y_{sim}(x, y)\right],$$

where x represents a phrase characteristic vector of the pending candidate phrase, y represents a phrase characteristic vector of the key phrase that has been selected into the key phrase set, $S_1(x, D)$ represents the divergence degree of the pending candidate phrase, $S(x, D)$ represents the association degree between the pending candidate phrase and the original document, $Y_{sim}(x, y)$ represents the association degree between the pending candidate phrase and the key phrase that has been selected into the key phrase set, and $\lambda$ represents the preset divergence degree, $\lambda$ is more than or equal to 0 and less than or equal to 1.

In another alternative embodiment, the receiving module 51 includes an extraction submodule.

The extraction submodule is configured to extract multiple candidate phrases matched with a preset phrase granularity from the original document according to a candidate phrase extraction rule determined based on the preset phrase granularity, each of the candidate phrases matched with the preset phrase granularity includes a nominal phrase combined by a modifying word and a nominal word.

In another alternative embodiment, the device 50 further includes a construction module, a generation module, a second selection module and a determination module.

The construction module is configured to form a denoised document by extracting at least one verbal, nominal or adjective words from the original document.

The generation module is configured to calculate a document characteristic vector of the denoised document by use of a vector generation model trained based on an unlabeled corpus.

The second selection module is configured to select at least one of nominal words or nominal phrases from the denoised document to obtain a to-be-clustered word set, each of the nominal phrase is combined by a modifying word and a nominal word.

The determination module is configured to acquire a word characteristic vector of each to-be-clustered word in the to-be-clustered word set by use of the vector generation model and cluster the to-be-clustered words according to their respective word characteristic vectors to determine multiple cluster sets of the original document.

In another alternative embodiment, the first acquisition module 52 is further configured to calculate the association degree between each candidate phrase in the candidate set and the original document according to the document characteristic vector of the denoised document, the multiple cluster sets and a phrase characteristic vector of each candidate phrase.

In another alternative embodiment, a calculation formula for the association degree between each candidate phrase in the candidate set and the original document is:

$$S(z, D) = \alpha \cdot Y_{sim}(z, V_0) + \beta \cdot \frac{\sum_{i=1}^{M} Y_{sim}(z, C_i)}{M},$$

where z represents a phrase characteristic vector of any candidate phrase in the candidate set, S(z, D) represents an association degree between any candidate phrase in the candidate set and the original document, $\alpha$ represents a first weight coefficient, $\beta$ represents a second weight coefficient, $Y_{sim}(\ )$ is a similarity function, $V_0$ represents the document characteristic vector, $C_i$ is a cluster characteristic vector of the ith cluster set, and M is the number of cluster sets, i and M are positive integers.

Figure 6:
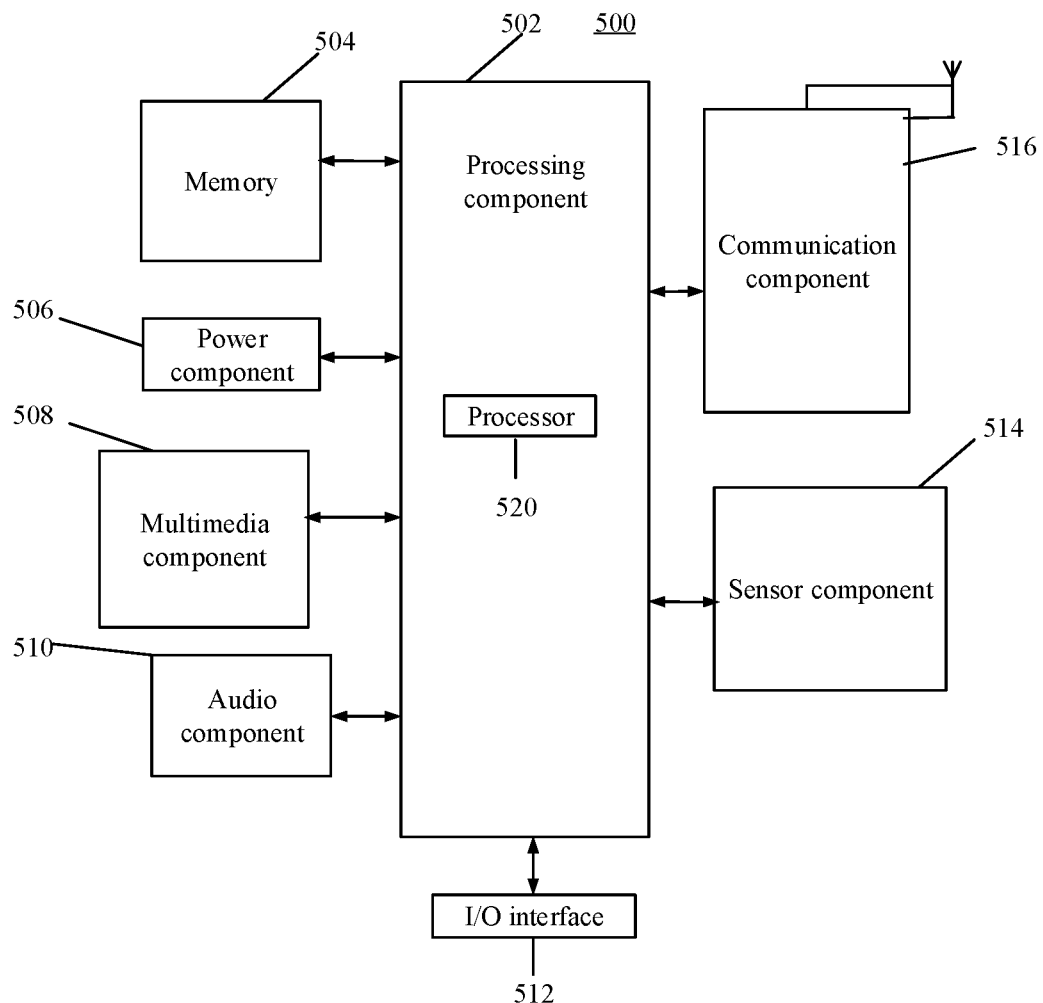
FIG. 6 is a first hardware structure block diagram of a keyword extraction device, according to an example of the present disclosure.

FIG. 6 is a first hardware structure block diagram of a keyword extraction device 500, according to some embodiments of the disclosure. For example, the device 500 may be a mobile phone, a computer, a digital broadcast terminal, a messaging device, a gaming console, a tablet, a medical device, exercise equipment, a personal digital assistant and the like.

Referring to FIG. 6, the device 500 may include one or more of the following components: a processing component 502, a memory 504, a power component 506, a multimedia component 508, an audio component 510, an Input/Output (I/O) interface 512, a sensor component 514, and a communication component 516.

The processing component 502 typically controls overall operations of the device 500, such as the operations associated with display, telephone calls, data communications, camera operations, and recording operations. The processing component 502 may include one or more processors 520 to execute instructions to perform all or part of the operations in the abovementioned method. Moreover, the processing component 502 may include one or more modules which facilitate interaction between the processing component 502 and the other components. For instance, the processing component 502 may include a multimedia module to facilitate interaction between the multimedia component 508 and the processing component 502.

The memory 504 is configured to store various types of data to support the operation of the device 500. Examples of such data include instructions for any application programs or methods operated on the device 500, contact data, phonebook data, messages, pictures, video, etc. The memory 504 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 506 provides power for various components of the device 500. The power component 506 may include a power management system, one or more power supplies, and other components associated with generation, management and distribution of power for the device 500.

The multimedia component 508 includes a screen providing an output interface between the device 500 and a user. In some embodiments, the screen may include a Liquid Crystal Display (LCD) and a Touch Panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action but also detect a duration and pressure associated with the touch or swipe action. In some embodiments, the multimedia component 508 includes a front camera and/or a rear camera. The front camera and/or the rear camera may receive external multimedia data when the device 500 is in an operation mode, such as a photographing mode or a video mode. Each of the front camera and the rear camera may be a fixed optical lens system or have focusing and optical zooming capabilities.

The audio component 510 is configured to output and/or input an audio signal. For example, the audio component 510 includes a Microphone (MIC), and the MIC is configured to receive an external audio signal when the device 500 is in the operation mode, such as a call mode, a recording mode and a voice recognition mode. The received audio signal may further be stored in the memory 504 or sent through the communication component 516. In some embodiments, the audio component 510 further includes a speaker configured to output the audio signal.

The I/O interface 512 provides an interface between the processing component 502 and a peripheral interface module, and the peripheral interface module may be a keyboard, a click wheel, a button and the like. The button may include, but not limited to: a home button, a volume button, a starting button and a locking button.

The sensor component 514 includes one or more sensors configured to provide status assessment in various aspects for the device 500. For instance, the sensor component 514 may detect an on/off status of the device 500 and relative positioning of components, such as a display and small keyboard of the device 500, and the sensor component 514 may further detect a change in a position of the device 500 or a component of the device 500, presence or absence of contact between the user and the device 500, orientation or acceleration/deceleration of the device 500 and a change in temperature of the device 500. The sensor component 514 may include a proximity sensor configured to detect presence of an object nearby without any physical contact. The sensor component 514 may also include a light sensor, such as a Complementary Metal Oxide Semiconductor (CMOS) or Charge Coupled Device (CCD) image sensor, configured for use in an imaging application. In some embodiments, the sensor component 514 may also include an acceleration sensor, a gyroscope sensor, a magnetic sensor, a pressure sensor or a temperature sensor.

The communication component 516 is configured to facilitate wired or wireless communication between the device 500 and other equipment. The device 500 may access a communication-standard-based wireless network, such as a Wireless Fidelity (WiFi) network, a 2nd-Generation (2G) or 3rd-Generation (3G) network or a combination thereof. In some embodiments of the disclosure, the communication component 516 receives a broadcast signal or broadcast associated information from an external broadcast management system through a broadcast channel. In some embodiments of the disclosure, the communication component 516 further includes a Near Field Communication (NFC) module to facilitate short-range communication. For example, the NFC module may be implemented based on a Radio Frequency Identification (RFID) technology, an Infrared Data Association (IrDA) technology, an Ultra-WideBand (UWB) technology, a Bluetooth (BT) technology and another technology.

In some embodiments of the disclosure, the device 500 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the abovementioned method.

In some embodiments of the disclosure, there is also provided a non-transitory computer-readable storage medium including an instruction, such as the memory 504 including an instruction, and the instruction may be executed by the processor 520 of the device 500 to implement the abovementioned method. For example, the processor can include one or more processors. For example, the non-transitory computer-readable storage medium may be a ROM, a Random Access Memory (RAM), a Compact Disc Read-Only Memory (CD-ROM), a magnetic tape, a floppy disc, an optical data storage device and the like.

According to a non-transitory computer-readable storage medium, an instruction in the storage medium is executed by a computing device having one or more processors to perform acts comprising a keyword extraction method, the method includes the following operations: an original document is received, and multiple candidate phrases are extracted from the original document to form a candidate set; an association degree between each candidate phrase in the candidate set and the original document is acquired; a divergence degree of each candidate phrase in the candidate set is acquired; and at least one candidate phrase is selected from the candidate set as a key phrase based on the association degree and the divergence degree, to form a key phrase set of the original document based on the selected at least one key phrase.

Figure 7:
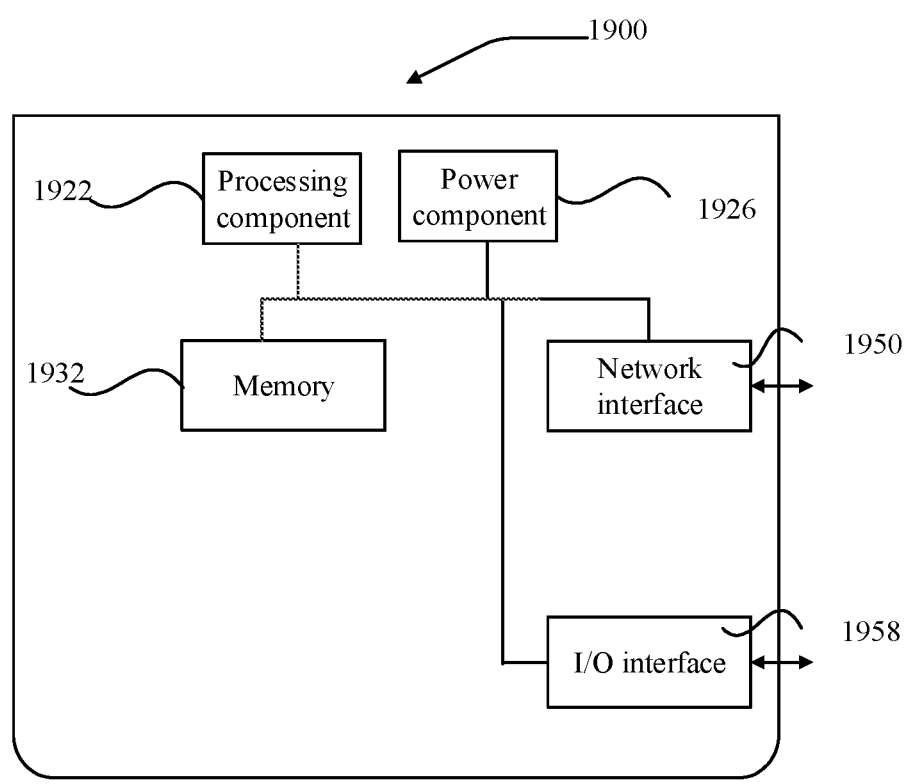
FIG. 7 is a second hardware structure block diagram of a keyword extraction device, according to an example of the present disclosure.

FIG. 7 is a second hardware structure block diagram of a keyword extraction device 1900, according to some embodiments of the disclosure. For example, the device 1900 may be provided as a server. Referring to FIG. 7, the device 1900 includes a processing component 1922, further including one or more processors, and a memory resource represented by a memory 1932, configured to store an instruction executable for the processing component 1922, for example, an application program. The application program stored in the memory 1932 may include one or more than one module of which each corresponds to a set of instructions. In addition, the processing component 1922 is configured to execute the instruction to execute the keyword extraction method, the method includes the following operations:

an original document is received, and multiple candidate phrases are extracted from the original document to form a candidate set;

an association degree between each candidate phrase in the candidate set and the original document is acquired;

a divergence degree of each candidate phrase in the candidate set is acquired; and at least one candidate phrase is selected from the candidate set as a key phrase based on the association degree and the divergence degree, to form a key phrase set of the original document based on the selected at least one key phrase.

The device 1900 may further include a power component 1926 configured to execute power management of the device 1900, a wired or wireless network interface 1950 configured to connect the device 1900 to a network and an I/O interface 1958. The device 1900 may be operated based on an operating system stored in the memory 1932, for example, Windows Server™, Max OS X™, Unix™, Linux™, Free-BSD™ or the like.

The embodiments of the present disclosure may have the following beneficial effects.

According to the present disclosure, an association degree between each candidate phrase and an original document is acquired, an divergence degree of each candidate phrase is acquired, and at least one candidate phrase is selected from the candidate set as the key phrase based on the association degree and the divergence degree to update the key phrase set of the original document based on the at least one candidate phrase. The association degrees between the candidate phrases and the original document and the divergence degrees of the candidate phrases are considered when the key phrase is determined. The association degree may represent a similarity between the candidate phrase and the original document, and if the association degree is higher, the similarity between the candidate phrase and the original document is higher. The divergence degree may represent a difference between the candidate phrases, and if the divergence degree is higher, the difference between the candidate phrases is greater. That is, the similarity between the candidate phrase and the original document is higher and a similarity between the candidate phrase and the key phrase that has been selected into the key phrase set is lower.

Compared with the related art that the key phrase is selected only based on counts of the candidate phrases, the present disclosure has the advantages that an association relationship between the candidate phrase, the original document and the key phrase that has been selected into the key phrase set is considered, so that, in a key phrase extraction process, the candidate phrase of which the association degree with the original document is relatively high may be selected from the candidate set as a key phrase to ensure a high similarity between the extracted key phrase and the original document to further improve accuracy and commonality of the extracted key phrase, and the candidate phrase of which the divergence degree is relatively high may be selected from the candidate set as a key phrase to ensure a great difference between the extracted key phrase and the key phrase that has been selected into the key phrase set to further improve diversity of the extracted key phrase. For example, if the original document is a text, based on the embodiments of the present disclosure, key phrases capable of expressing a core idea of the text may be rapidly summarized to further determine whether the text is a text that a user needs to read, so that accurate text recommendation may be implemented, and text reading efficiency of the user may be improved.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable sub combination.

Moreover, although features can be described above as acting in certain combinations and even initially claimed as such, one or more features from a claimed combination can in some cases be excised from the combination, and the claimed combination can be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

In the description of the present disclosure, the terms "some embodiments," "example," or "some examples," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described may be combined in a suitable manner in any one or more embodiments or examples. In addition, various embodiments or examples described in the specification, as well as features of various embodiments or examples, may be combined and reorganized.

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable sub combinations.

Moreover, although features can be described above as acting in certain combinations and even initially claimed as such, one or more features from a claimed combination can in some cases be excised from the combination, and the claimed combination can be directed to a sub combination or variations of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

What is claimed is:

1. A method for keyword extraction, comprising:
receiving, at a terminal, an original document;
acquiring, at the terminal, a candidate set by extracting at least one candidate phrase from the original document;
acquiring, at the terminal, an association degree between the at least one candidate phrase in the candidate set and the original document, wherein the association degree indicates a degree of similarity between the at least one candidate phrase and the original document;
determining, at the terminal, a divergence degree of the at least one candidate phrase in the candidate set based on the association degree between the at least one candidate phrase and the original document, the association degree between the at least one candidate phrase and at least one key phrase selected in a key phrase set, and a preset divergence degree, wherein the divergence degree indicates a degree of difference between the at least one candidate phrase and a key phrase that has been selected into the key phrase set, and the key phrase set comprises an initial key phrase selected from the candidate set based on the association degree between each candidate phrase in the candidate set and the original document; and updating, at the terminal, the key phrase set of the original document by selecting, from the candidate set, at least one candidate phrase of which the association degree is greater than a preset association degree threshold and the divergence degree is greater than a preset divergence degree threshold as at least one key phrase, so that a core idea of the original document is summarized.

2. The method of claim 1, wherein determining, at the terminal, the divergence degree comprises obtaining the divergence degree based on a divergence degree formula comprising:

$$S_1(x, D) = \arg\max_{x \in \Omega \setminus \theta}\left[(1 - \lambda)S(x, D) - \lambda \max_{y \in \theta} y_{sim}(x, y)\right],$$

wherein x represents a phrase characteristic vector of the at least one candidate phrase, y represents a phrase characteristic vector of the at least one key phrase that has been selected into the key phrase set, $S_1(x, D)$ represents the divergence degree of the at least one candidate phrase, $S(x, D)$ represents the association degree between the at least one candidate phrase and the original document, $Y_{sim}(x, y)$ represents the association degree between the at least one candidate phrase and the at least one key phrase that has been selected into the key phrase set, and $\lambda$ represents the preset divergence degree, wherein the preset divergence degree is more than or equal to 0 and less than or equal to 1.

3. The method of claim 1, wherein extracting, at the terminal, the at least one candidate phrase from the original document comprises:
extracting, at the terminal, the at least one candidate phrase that matches with a preset phrase granularity from the original document according to a candidate phrase extraction rule determined based on the preset phrase granularity,
wherein the at least one candidate phrase that matches with the preset phrase granularity comprises a nominal phrase combined by a modifying word and a nominal word.

4. The method of claim 1, further comprising:
acquiring, at the terminal, a denoised document by extracting at least one verbal, nominal or adjective word from the original document;
calculating, at the terminal, a document characteristic vector using the denoised document and a vector generation model, wherein the vector generation model is trained based on an unlabeled corpus;
acquiring, at the terminal, a to-be-clustered word set by selecting, from the denoised document, at least one nominal word or nominal phrases, wherein the nominal phrases are combined by a modifying word and the at least one nominal word;
acquiring, at the terminal, a word characteristic vector of at least one to-be-clustered word based on the to-be-clustered word set and the vector generation model; and
determining, at the terminal, at least one cluster set based on the original document by clustering the at least one to-be-clustered word according to the word characteristic vector.

5. The method of claim 4, wherein acquiring, at the terminal, the association degree between the at least one candidate phrase in the candidate set and the original document comprises:

calculating, at the terminal, the association degree between the at least one candidate phrase in the candidate set and the original document according to the document characteristic vector of the denoised document, the at least one cluster set, and a phrase characteristic vector of the at least one candidate phrase.

6. The method of claim 5, wherein determining, at the terminal, the association degree comprises an association degree formula comprising:

$$S(z, D) = \alpha \cdot Y_{sim}(z, V_0) + \beta \cdot \frac{\sum_{i=1}^{M} Y_{sim}(z, C_i)}{M},$$

wherein z represents the phrase characteristic vector of the at least one candidate phrase in the candidate set, $S(z, D)$ represents the association degree between the at least one candidate phrase in the candidate set and the original document, $\alpha$ represents a first weight coefficient, $\beta$ represents a second weight coefficient, $Y_{sim}( \ )$ is a similarity function, $V_0$ represents the document characteristic vector, $C_i$ is a cluster characteristic vector of the ith cluster set, and M is a number of cluster sets, i and M are positive integers.

7. A device for keyword extraction, comprising:
one or more processors;
a non-transitory computer-readable storage medium configured to store a plurality of instructions executable by the one or more processors,
wherein the one or more processors are configured to:
receive an original document;
acquire a candidate set by extracting at least one candidate phrase from the original document;
acquire an association degree between the at least one candidate phrase in the candidate set and the original document, wherein the association degree indicates a degree of similarity between the at least one candidate phrase and the original document;
determine a divergence degree of the at least one candidate phrase in the candidate set based on the association degree between the at least one candidate phrase and the original document, the association degree between the at least one candidate phrase and at least one key phrase selected in a key phrase set, and a preset divergence degree, wherein the divergence degree indicates a degree of difference between the at least one candidate phrase and a key phrase that has been selected into the key phrase set, and the key phrase set comprises an initial key phrase selected from the candidate set based on the association degree between each candidate phrase in the candidate set and the original document; and
update a key phrase set of the original document by selecting, from the candidate set, at least one candidate phrase of which the association degree is greater than a preset association degree threshold and the divergence degree is greater than a preset divergence degree threshold as at least one key phrase so that a core idea of the original document is summarized.

8. The device of claim 7, wherein determining the divergence degree comprises a divergence degree formula comprising:

$$S_1(x, D) = \arg\max_{x \in \Omega \setminus \theta}\left[(1 - \lambda)S(x, D) - \lambda \max_{y \in \theta} y_{sim}(x, y)\right],$$

wherein x represents a phrase characteristic vector of the at least one candidate phrase, y represents a phrase characteristic vector of the at least one key phrase that has been selected into the key phrase set, $S_1(x, D)$ represents the divergence degree of the at least one candidate phrase, $S(x, D)$ represents the association degree between the at least one candidate phrase and the original document, $Y_{sim}(x, y)$ represents the association degree between the at least one candidate phrase and the at least one key phrase that has been selected into the key phrase set, and $\lambda$ represents the preset divergence degree, wherein the preset divergence degree is more than or equal to 0 and less than or equal to 1.

9. The device of claim 7, wherein the one or more processors are further configured to:
   extract the at least one candidate phrase that matches with a preset phrase granularity from the original document according to a candidate phrase extraction rule determined based on the preset phrase granularity, wherein the at least one candidate phrase matches with the preset phrase granularity comprises a nominal phrase combined by a modifying word and a nominal word.

10. The device of claim 7, wherein the one or more processors are further configured to:
    acquire a denoised document by extracting at least one verbal, nominal or adjective word from the original document;
    calculate a document characteristic vector using the denoised document and a vector generation model, wherein the vector generation model is trained based on an unlabeled corpus;
    acquire a to-be-clustered word set by selecting, from the denoised document, at least one nominal word or nominal phrases, wherein the nominal phrases are combined by a modifying word and the at least one nominal word; and
    acquire a word characteristic vector of at least one to-be-clustered word based on the to-be-clustered word set and the vector generation model; and
    determine at least one cluster set based on the original document by clustering the at least one to-be-clustered word according to the word characteristic vector.

11. The device of claim 10, wherein the one or more processors are further configured to:
    calculate the association degree between the at least one candidate phrase in the candidate set and the original document according to the document characteristic vector of the denoised document, the at least one cluster set and a phrase characteristic vector of at least one candidate phrase.

12. The device of claim 11, wherein determining the association degree comprises an association degree formula comprising:

$$S(z, D) = \alpha \cdot Y_{sim}(z, V_0) + \beta \cdot \frac{\sum_{i=1}^{M} Y_{sim}(z, C_i)}{M},$$

wherein z represents the phrase characteristic vector of the at least one candidate phrase in the candidate set, $S(z, D)$ represents the association degree between the at least one candidate phrase in the candidate set and the original document, $\alpha$ represents a first weight coefficient, $\beta$ represents a second weight coefficient, $Y_{sim}()$ is a similarity function, $V_0$ represents the document characteristic vector, $C_i$ is a cluster characteristic vector of the ith cluster set, and M is a number of cluster sets, i and M are positive integers.

13. A non-transitory computer-readable storage medium having a plurality of instructions stored thereon, the plurality of instructions, when being executed by a computing device having one or more processors to perform acts comprising:
    receiving an original document;
    acquiring a candidate set by extracting at least one candidate phrase from the original document;
    acquiring an association degree between at least one candidate phrase in the candidate set and the original document, wherein the association degree indicates a degree of similarity between the at least one candidate phrase and the original document;
    determining a divergence degree of the at least one candidate phrase in the candidate set based on the association degree between the at least one candidate phrase and the original document, the association degree between the at least one candidate phrase and at least one key phrase selected in a key phrase set, and a preset divergence degree, wherein the divergence degree indicates a degree of difference between the at least one candidate phrase and a key phrase that has been selected into the key phrase set, and the key phrase set comprises an initial key phrase selected from the candidate set based on the association degree between each candidate phrase in the candidate set and the original document; and
    updating the key phrase set of the original document by selecting, from the candidate set, the at least one candidate phrase of which the association degree is greater than a preset association degree threshold and the divergence degree is greater than a preset divergence degree threshold as at least one key phrase, so that a core idea of the original document is summarized.

14. The non-transitory computer-readable storage medium according to claim 13, wherein determining the divergence degree comprises a divergence degree formula comprising:

$$S_1(x, D) = \underset{x \in \Omega \backslash \theta}{\arg\max}\left[(1 - \lambda)S(x, D) - \lambda\underset{y \in \theta}{\max} y_{sim}(x, y)\right],$$

wherein x represents a phrase characteristic vector of the at least one candidate phrase, y represents a phrase characteristic vector of the at least one key phrase that has been selected into the key phrase set, $S_1(x, D)$ represents the divergence degree of the pending candidate phrase, $S(x, D)$ represents the association degree between the at least one candidate phrase and the original document, $Y_{sim}(x, y)$ represents the association degree between the at least one candidate phrase and the at least one key phrase that has been selected into the key phrase set, and $\lambda$ represents the preset divergence degree, wherein the preset divergence degree is more than or equal to 0 and less than or equal to 1.

* * * * *